United States Patent Office 3,568,298
Patented Mar. 9, 1971

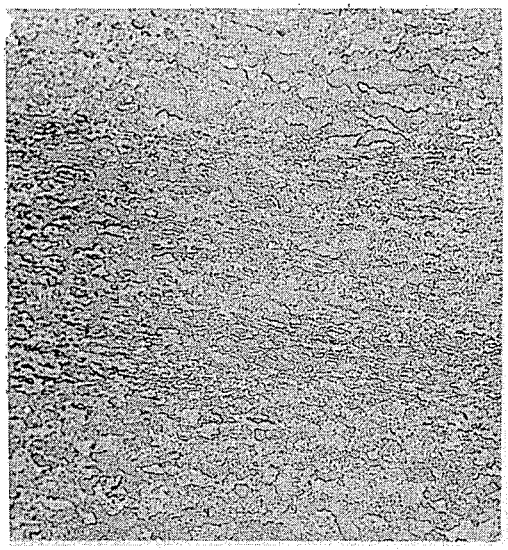
Fig.-7.-
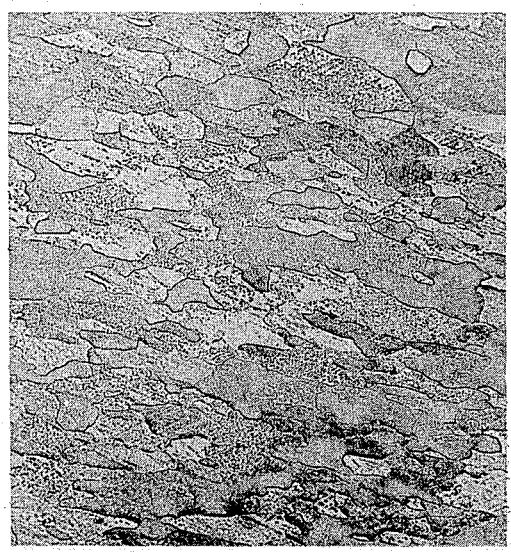
Fig.-6.-
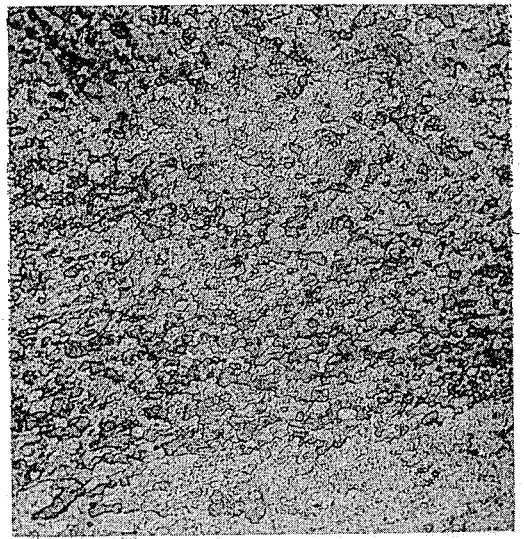
Fig.-9.-
Fig.-8.-
INVENTORS
MARION R. CALTON
HENRY J. VERMILLION, JR.
ROBERT D. WILLIAMS

3,568,298
FRICTION WELDING MOLYBDENUM AND TUNGSTEN
Marion R. Calton, East Peoria, Henry J. Vermillion, Jr., Peoria, and Robert D. Williams, Toulon, Ill., assignors to Caterpillar Tractor Co., Peoria, Ill.
Filed July 15, 1968, Ser. No. 744,921
Int. Cl. B23k 27/00
U.S. Cl. 29—470.3     5 Claims

ABSTRACT OF THE DISCLOSURE

Friction welding molybdenum and tungsten materials, including inertia friction welding thereof, and further including speed, pressure and input energy parameters for the welding of these materials.

BACKGROUND OF THE INVENTION

This invention relates to improvements in friction welding of the general type wherein two workpieces are subjected to relative rotation while in rubbing contact with each other to generate frictional heat to raise the workpieces to a suitable welding temperature whereupon the relative rotation subsides and the workpieces become bonded to each other.

It is also to be understood that the invention is applicable to the inertia welding process as described in U.S. Pat. No. 3,273,233 and as set forth below.

In the inertia welding process the energy required to bring the common interface of the parts to a bondable condition is stored as kinetic energy in rotating inertia weights. These weights generally take the form of flywheels and are connected to one of the parts and the entire energy necessary to form the bond is stored in the weights prior to engagement of the parts at interface. The stored energy is discharged into the interface through frictional heating and plastic working developed at the interface as the rubbing contact slows the rotating weights and the bonding cycle is concluded.

Two metals which fall into the "difficult to join" category are molybdenum and tungsten. Both of these metals are considered refractory metals with "refractory" being generally defined as "difficult to fuse, corrode, or draw out; capable of enduring high temperatures." Certain metallurgical handbooks indicate that molybdenum and tungsten can be welded by arc, resistance, percussion, flash and electron beam methods but warn that absolute cleanliness of the surface is essential. In addition, these metallurgical handbooks point out that fusion welding of molybdenum and tungsten must be carried out in a closely controlled inert atmosphere.

Because of the above listed stringent requirements for conventional welding of molybdenum and tungsten, it is, in most cases, impractical to join these metals by the above methods.

It should be further observed that these metals, molybdenum and tungsten, are extremely brittle materials in certain states, especially the recrystallized form. It is perhaps for this reason that recently published literature lists molybdenum and tungsten as unweldable by conventional frictional welding methods. Because of this brittleness, previous attempts to friction weld these materials inevitably resulted in shattering of the workpiece specimens.

Consequently, full commercial exploitation of these valuable refractory metals, molybdenum and tungsten, depends upon the availability of suitable methods of joining components constructed thereof.

Accordingly, it is the principal object of the present invention to friction weld these brittle refractory metals, molybdenum and tungsten, without the necessity of providing a closely controlled atmosphere wherein a good weld will be produced exhibiting the strength of the parent metal.

It is a further object of the present invention to provide speed, pressure and input energy parameters for the friction welding of various forms of molybdenum and tungsten.

Other and further objects and advantages of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWINGS

FIG. 6 is a photomicrograph illustrating an unwelded specimen of swaged tungsten;

FIG. 7 is a photomicrograph illustrating the microstructure in the weld zone of a specimen of swaged tungsten which has been bonded by the method of the present invention;

FIG. 8 is a photomicrograph illustrating an unwelded specimen of recrystallized tungsten; and, FIG. 9 is a photomicrograph illustrating the microstructure in the weld zone of a specimen of recrystallized tungsten which has been bonded by the method of the present invention.

DESCRIPTION OF THE PREFERRED EMBODIMENT

Figure 1:
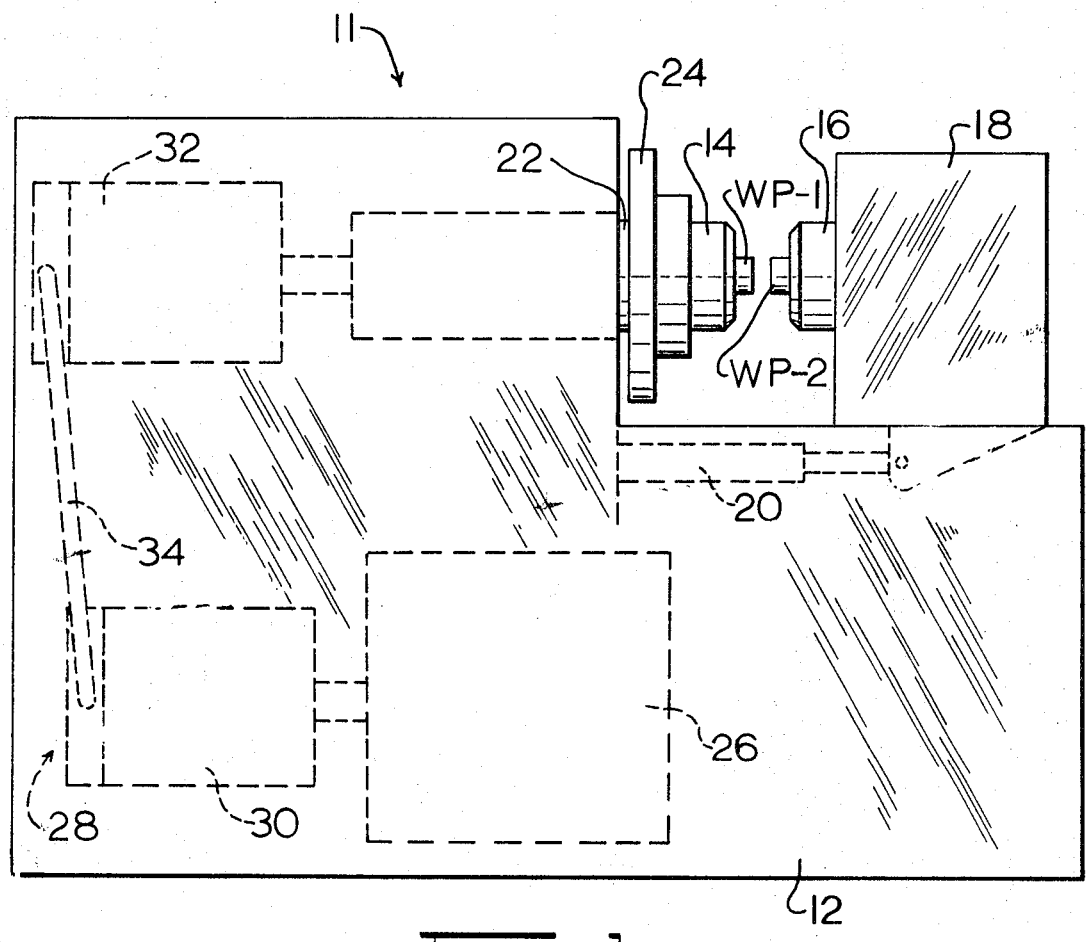
FIG. 1 is a side elevation illustrating an embodiment of a friction welding machine which may be used to practice the present invention.

A friction welding machine constructed in accordance with one exemplary embodiment of the present invention is indicated generally by the reference numeral 11 in FIG. 1. As shown, the machine comprises a frame or housing structure generally denoted at 12 for housing the various elements of the machine. The two parts to be welded, workpieces WP–1 and WP–2, are mounted within chucks 14 and 16.

The chuck 16 does not rotate and is mounted on a tailstock fixture 18. The fixture 18 is mounted for axial movement on the machine frame 12 under the control of a load cylinder 20. A pressure control circuit, not shown, regulates the pressure in the load cylinder, and thus determines the force with which the parts WP–1 and WP–2 are engaged.

The chuck 14 is mounted on a spindle 22, and the chuck and spindle are mounted for rotation within the frame 12. The rotary spindle 22 is adapted to receive flywheels 24 which may be of various size and mass depending upon the particular application of the machine.

An electric motor 26 rotates the spindle through a hydrostatic transmission generally indicated by the reference numeral 28. The hydrostatic transmission includes a hydraulic pump 30, a hydraulic motor 32 and a manifold 34 between the pump and motor.

The drive ratio between the motor and the spindle 22 can be varied by changing the cam angles in either the pump 30 or the motor 32, and the pump and motor can be used to effectively disconnect the motor 26 from the spindle 22 by moving the cam and the pump 30 to a position in which the pump 30 does not displace any hydraulic fluid to the motor 32.

It is to be understood that the flywheel weights 24 are mounted on the spindle 22 so that the welding machine 11 can be operated as an inertia friction welding machine as described in U.S. Pat. No. 3,273,233 and as described in further detail below.

A welding operation to join a first workpiece such as molybdenum or tungsten to a second workpiece, can be performed by operating the machine in the following general manner. One of the weld pieces WP–1 is firmly clamped in the rotatable chuck 14 located on the spindle 22. The other weld piece WP–2 is firmly clamped in the non-rotatable chuck 16 which is located on the tailstock portion 18 of the machine. Upon actuation of the motor 26, the flywheel and workpiece WP–1 are accelerated to a predetermined velocity.

Once the predetermined velocity has been obtained, the motor 26 is disconnected or shutdown and the ram mechanism 20 is actuated to move tailstock portion 18 and workpiece WP–2 into contact with the rapidly rotating workpiece WP–1. As the two workpieces are brought into contact under the upsetting pressure applied through ram 20, heat is generated at the contacting surface or interface of the weld pieces. This heating increases until the workpieces reach the weld temperature, at which time the upsetting pressure, applied by the ram 20 at either a constant or varying pressure causes flashing or upsetting to occur. During this heating and flashing, the rotational velocity of the spindle member 22 has continued to decrease. At the time the rotation of the spindle ceases, upsetting has taken place and the weld is completed.

From the work done involving many samples and various test programs, parameter ranges have been established for the friction welding of molybdenum and tungsten. These various test programs revealed that while the parameter values for total input energy and axial pressure are quite important, it would appear that high peripheral velocity or surface speed is of utmost importance for the successful welding of molybdenum and tungsten.

If the surface speed is allowed to fall below certain minimal values the weld zone will be characterized by extremely uneven flashing and shattering of the metal will occur. In addition, if the surface speed is too low the high first stage torques will cause strong seizure type incipient welds upon initial contact. The resultant unsymmetrical forces will then create sidewise thrust forces which tend to bend the weld bar specimens.

From certain exemplary welds, some of which will be described below, and other tests which have been conducted, minimum parameter values have been established for the friction welding of the refractory metals molybdenum and tungsten. These minimum parameter values are:

SWAGED MOLYBDENUM

Surface velocity _____ 1,750 feet per minute.
Axial load or pressure __ 2,600 pounds per square inch
Input energy _____ 25,000 foot-pounds per square inch.

RECRYSTALLIZED MOLYBDENUM

Surface velocity _____ 2,200 feet per minute.
Axial load or pressure __ 6,000 pounds per square inch.
Input energy _____ 35,000 foot-pounds per square inch.

SWAGED TUNGSTEN

Surface velocity _____ 2,600 feet per minute.
Axial Load or pressure __ 5,500 pounds per square inch.
Input energy _____ 25,000 foot-pounds per square inch.

RECRYSTALLIZED TUNGSTEN

Surface velocity _____ 3,500 feet per minute.
Axial load or pressure __ 3,000 pounds per square inch.
Input energy _____ 40,000 foot-pounds per square inch.

Figure 2:
FIG. 2 is a photomicrograph illustrating an unwelded specimen of swaged molybdenum.

FIG. 2 is a photomicrograph which illustrates the microstructure of an unwelded area of a base metal comprised of swaged molybdenum. The specimen in FIG. 2 was etched with Murakami's Etch (potassium hydroxide plus potassium ferri cyanide plus water) and magnified 250 times.

Figure 3:
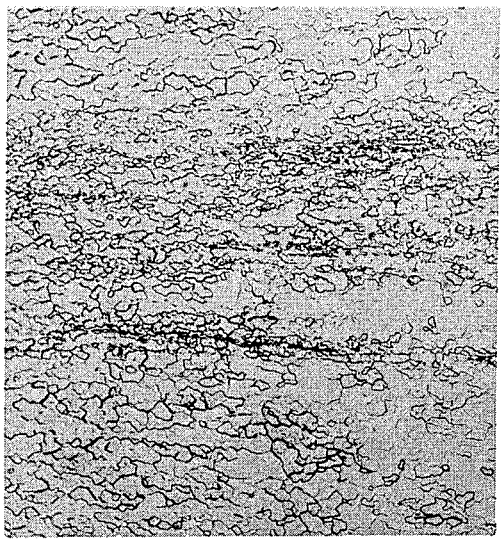
FIG. 3 is a photomicrograph illustrating the microstructure in the weld zone of a specimen of swaged molybdenum which has been bonded by the method of the present invention.

FIG. 3 is a photomicrograph illustrating the microstructure through the weld area of an inertia friction welded specimen of swaged molybdenum which was welded under the parameter conditions which are the subject of the present invention. FIG. 3 has also been etched with Murakami's Etch and magnified 250 times. This is considered to be an excellent weld and it should be observed that the large elongated grains shown in the base metal of FIG. 2 have been broken up and refined into the small grains shown in the weld of FIG. 3. This grain refinement produced under the friction welding parameters of the present invention is one of the many advantages of joining these metals by the subject process.

Figure 4:
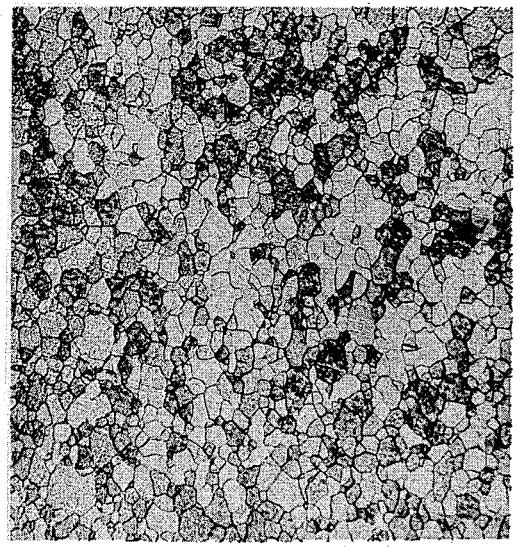
FIG. 4 is a photomicrograph illustrating an unwelded specimen of recrystallized molybdenum.

FIG. 4 is a photomicrograph illustrating the microstructure of an unwelded area of a base metal of recrystallized molybdenum. The recrystallized molybdenum specimen illustrated in FIG. 4 has been magnified 100 times.

Figure 5:
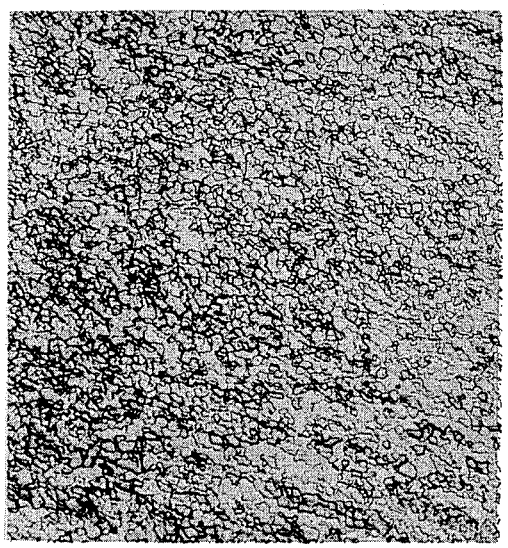
FIG. 5 is a photomicrograph illustrating the microstructure in the weld zone of a specimen of recrystallized molybdenum which has been bonded by the method of the present invention.

FIG. 5 is a photomicrograph illustrating the microstructure through the weld area of a specimen of recrystallized molybdenum which was inertia friction welded by a process which utilized the parameters of the present invention. The photomicrograph of FIG. 5 has been magnified 250 times. Both specimens illustrated in FIGS. 4 and 5 were etched with Murakami's Etch.

The actual weld (which is invisible) is in the center of FIG. 5 and runs horizontally across the photomicrograph. The photomicrograph of FIG. 5 may be compared with the photomicrograph of FIG. 4 and it should be observed that the grains of the weld specimen of FIG. 5 have been worked and refined over those shown in the photomicrograph of FIG. 4.

FIG. 6 is a photomicrograph illustrating the microstructure of an unwelded area of a base metal of swaged tungsten. The photomicrograph of FIG. 6 has been magnified 100 times and was etched with a solution of ammonium hydroxide and hydrogen peroxide ($NH_4OH + H_2O_2$).

FIG. 7 is a photomicrograph illustrating the microstructure through the weld area of a specimen of swaged tungsten which was inertia friction welded by a process incorporating the welding parameters of the subject invention. The photomicrograph of FIG. 7 has been magnified 250 times and was also etched with a solution of ammonium hydroxide and hydrogen peroxide ($NH_4OH + H_2O_2$). The actual weld (which is invisible) is in the center of FIG. 7 and runs horizontally across the photomicrograph.

By comparing FIGS. 6 and 7, it is easily observed that the large elongated grains shown in the base metal of FIG. 6 have been broken up and refined into the small grains shown in the weld of FIG. 7. This grain refinement produced by friction welding under the process parameters of the subject invention is one of the many advantages of joining materials by this process.

FIG. 8 is a photomicrograph illustrating the microstructure of an unwelded area of a base metal of recrystallized tungsten. The photomicrograph of FIG. 8 has been magnified 100 times and was etched with a solution of ammonium hydroxide and hydrogen peroxide $$(NH_4OH + H_2O_2)$$

FIG. 9 is a photomicrograph illustrating the microstructure through the weld area of a specimen of recrystallized tungsten which was inertia friction welded by a process incorporating the welding parameters of the subject invention. The photomicrograph of FIG. 9 has been magnified 250 times and was also etched with a solution of ammonium hydroxide and hydrogen peroxide $$(NH_4OH + H_2O_2)$$

The actual weld (which is invisible) is in the center of FIG. 9 and runs horizontally across the photomicrograph. By comparing FIGS. 8 and 9, it is easily observed that the large grains shown in the base metal of FIG. 8 have been broken up and refined into the small grains shown in the weld of FIG. 9.

While we have illustrated and described preferred embodiments of our invention, it is to be understood that these are capable of variation and modification, and we therefore do not wish to be limited to the precise details set forth, but desire to avail ourselves of such changes and alterations as fall within the purview of the following claims.

What is claimed is:

1. A method of friction welding swaged molybdenum workpieces comprising the steps of effecting relative rotation of the workpieces at speeds in excess of approximately 1,750 surface feet per minute, forcing the workpieces into frictional engagement at their common interface under a predetermined axially applied pressure in excess of approximately 2,600 pounds per square inch, and effecting an energy transfer at the interface using an energy input in excess of approximately 25,000 foot-pounds per square inch, which concentrates heat at the interface until a bond is formed and all the input energy is expended.

2. A method of friction welding recrystallized molybdenum workpieces comprising the steps of effecting relative rotation of the workpieces at speeds in excess of approximately 2,200 surface feet per minute, forcing the workpieces into frictional engagement at their common interface under a predetermined axially applied pressure in excess of approximately 6,000 pounds per square inch, and effecting an energy transfer at the interface using an energy input in excess of approximately 35,000 foot-pounds per square inch, which concentrates heat at the interface until a bond is formed and all the input energy is expended.

3. A method of friction welding swaged tungsten workpieces comprising the steps of effecting relative rotation of the workpieces at speeds in excess of approximately 2,600 surface feet per minute, forcing the workpieces into frictional engagement at their common interface under a predetermined axially applied pressure in excess of approximately 5,500 pounds per square inch and effecting an energy transfer at the interface using an energy input in excess of approximately 25,000 foot-pounds square inch, which concentrates heat at the interface until a bond is formed and all the input energy is expended.

4. A method of friction welding recrystallized tungsten workpieces comprising the steps of effecting relative rotation of the workpieces at speeds in excess of approximately 3,500 surface feet per minute, forcing the workpieces into frictional engagement at their common interface under a predetermined axially applied pressure in excess of approximately 3,000 pounds per square inch, and effecting an energy transfer at the interface using an energy input in excess of approximately 40,000 foot-pounds per square inch, which concentrates heat at the interface until a bond is formed and all the input energy is expended.

5. A method as set forth in any one of claims 1, 2, 3 and 4 wherein said workpieces are friction welded to each other by the inertia friction welding process and wherein one of said workpieces is operatively associated with a rotating mass, which mass stores the requisite amount of input energy to be released at the weld interface.

References Cited

UNITED STATES PATENTS 3,273,233  9/1966  Eberle et al. _____ 29—470.3

JOHN F. CAMPBELL, Primary Examiner

D. P. ROONEY, Assistant Examiner